US011896995B2

(12) United States Patent
Kraft et al.

(10) Patent No.: US 11,896,995 B2
(45) Date of Patent: Feb. 13, 2024

(54) APPLICATOR FOR APPLYING A SEALING COMPOUND ONTO AN EDGING FOLD

(71) Applicant: Dürr Systems AG, Bietigheim-Bissingen (DE)

(72) Inventors: Bernd Kraft, Steinheim a. d. Murr (DE); Martin Halbgewachs, Steinheim a. d. Murr (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 17/637,916

(22) PCT Filed: Aug. 3, 2020

(86) PCT No.: PCT/EP2020/071820
§ 371 (c)(1),
(2) Date: Feb. 24, 2022

(87) PCT Pub. No.: WO2021/037493
PCT Pub. Date: Mar. 4, 2021

(65) Prior Publication Data

US 2022/0266288 A1 Aug. 25, 2022

(30) Foreign Application Priority Data

Aug. 27, 2019 (DE) ..................... 10 2019 122 918.9

(51) Int. Cl.
*B05C 5/02* (2006.01)
*B05B 15/652* (2018.01)
(Continued)

(52) U.S. Cl.
CPC .............. *B05C 5/0216* (2013.01); *B05B 1/04* (2013.01); *B05B 15/652* (2018.02); *B05C 7/06* (2013.01)

(58) Field of Classification Search
USPC .......................................... 118/300, 321, 323
See application file for complete search history.

(56) References Cited

U.S. PATENT DOCUMENTS 4,305,528 A 12/1981 Craig
4,468,695 A 8/1984 Ikeda et al.
(Continued)

FOREIGN PATENT DOCUMENTS

AT 504536 A1 * 6/2008 ............... B23H 7/26
DE 3145878 A1 6/1982
(Continued)

OTHER PUBLICATIONS

English Translation JP2005-313305A (Year: 2005).*
(Continued)

*Primary Examiner* — Yewebdar T Tadesse
(74) *Attorney, Agent, or Firm* — Bejin Bieneman PLC

(57) ABSTRACT

The present disclosure relates to an applicator for applying a coating agent (e.g. sealant) to a component (e.g. motor vehicle body component), having a nozzle for dispensing the coating agent and an elongate nozzle carrier which supports the nozzle. The invention provides that the nozzle carrier has a yield region in which the nozzle carrier is substantially less bend-resistant than in the remainder of the nozzle carrier in order to be able to yield elastically to contact forces in the event of contact between the applicator and the component to be coated.

17 Claims, 5 Drawing Sheets

(51) Int. Cl.

| | |
|---|---|
| ***B05B 1/04*** | (2006.01) |
| ***B05C 7/06*** | (2006.01) |

(56) References Cited

U.S. PATENT DOCUMENTS

| | | | | |
|---|---|---|---|---|
| 9,505,020 | B2 | 11/2016 | Rademacher | |
| 2010/0075058 | A1* | 3/2010 | Rademacher | B05C 5/0216 427/427.3 |
| 2011/0091657 | A1 | 4/2011 | Rademacher | |
| 2019/0210299 | A1 | 7/2019 | Hayama et al. | |
| 2019/0329283 | A1 | 10/2019 | Rademacher et al. | |
| 2022/0009004 | A1* | 1/2022 | Hollfelder | B23B 29/043 |

FOREIGN PATENT DOCUMENTS

| | | | | | |
|---|---|---|---|---|---|
| DE | 10 2008 027 994 | B3 | | 4/2010 | |
| DE | 10 2016 004 257 | A1 | | 10/2017 | |
| DE | 10 2017 001 780 | B3 | | 4/2018 | |
| DE | 102019200692 | A1 | * | 7/2020 | B22F 10/20 |
| EP | 2282845 | B1 | | 9/2016 | |
| JP | H0419092 | A | * | 1/1992 | |
| JP | 2005313305 | A | * | 11/2005 | |
| KR | 20150019103 | A | | 2/2015 | |
| WO | 2019040393 | A1 | | 2/2019 | |

OTHER PUBLICATIONS

International Search Report and Written Opinion dated Nov. 18, 2020 for PCT/EP2020/071820 (13 pages; with English translation).

Grindaix-Düsen als 3D-Druck. URL: https://grindaix.de/coolant-product/kuehlmittelduesen-3d-druck/, Archived on https://archive.org/web/ on Mar. 24, 2019 [accessed on Apr. 29, 2020] (2 pages; with English translation).

German Patent Office—Office Action dated May 4, 2020 for related application No. DE 10 2019 122 918.9 (6 pages; with English machine translation).

German Patent Office—Office Action dated Sep. 24, 2020 for related application No. DE 10 2019 122 918.9 (6 pages; with English machine translation).

* cited by examiner

Section A-A

APPLICATOR FOR APPLYING A SEALING COMPOUND ONTO AN EDGING FOLD

CROSS-REFERENCE TO RELATED APPLICATIONS

This application is a national stage of, and claims priority to, Patent Cooperation Treaty Application No. PCT/EP2020/071820, filed on Aug. 3, 2020, which application claims priority to German Application No. DE 10 2019 122 918.9, filed on Aug. 27, 2019, which applications are hereby incorporated herein by reference in their entireties.

BACKGROUND

An applicator for applying a coating agent (e.g. sealant) to a component (e.g. motor vehicle body component) is generally known. One such applicator is known, for example, from EP 2 282 845 B1. This known applicator has a multi-curved tubular nozzle carrier which can protrude through a gap between overlapping motor vehicle body components in order to apply a sealant to the rear side of a flanged seam. For example, the laterally overlapping motor vehicle body components may be a motor vehicle door and a fender. The known applicator advantageously allows the sealant to be applied to the rear of the vehicle door without having to open the vehicle door for this purpose.

With regard to the technical background of applicators, reference should also be made to DE 10 2017 001 780 B3, DE 10 2008 027 994 B3, DE 10 2016 004 257 A1 and the so-called Grindaix nozzles, which are manufactured by 3D printing.

DETAILED DESCRIPTION

Figure 1:
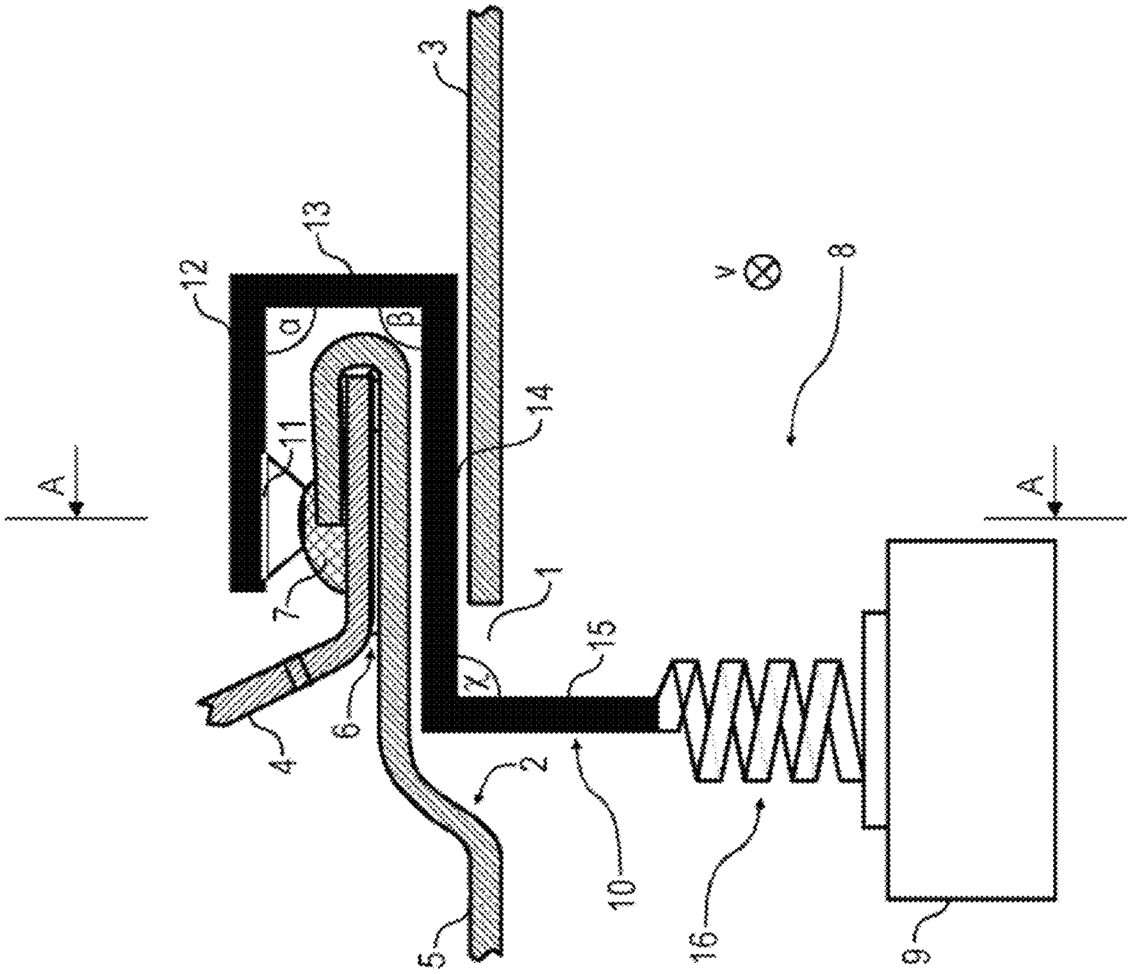
FIG. 1 a schematic representation of an applicator according to the invention for sealing a flanged seam, FIG. 2 a schematic sectional view along the line of intersection A-A in FIG. 1, FIG. 3 an exemplary characteristic curve for comparing the spring stiffness of the applicator according to FIGS. 1 and 2 with a conventional applicator, FIG. 4 a variation of FIG. 1, and FIG. 5 a further variation of FIG. 1.

When using known applicators there is a risk that the applicator will be plastically deformed due to contact between the applicator and the motor vehicle body and is then no longer functional. The present disclosure is therefore based on the task of creating a correspondingly improved applicator.

The applicator according to the present disclosure is also used for applying a coating agent to a component. The coating agent may be, for example, a sealant, but the term coating agent used in the context of the present disclosure is not limited to sealants. Rather, the term of a coating agent used in the context of the present disclosure also includes other types of coating agents, such as, for example, adhesives and insulating materials.

Furthermore, it should be mentioned that the applicator according to the present disclosure is prefconfigured to apply the coating agent (e.g. sealant) to a motor vehicle body component. However, the concept of a component used in the context of the present disclosure is not limited to motor vehicle body components, but also includes other types of components, such as add-on parts for motor vehicle body components or components of wind power systems, to name just a few examples.

The applicator according to the present disclosure first of all has, in accordance with the known applicator described at the beginning, a nozzle for dispensing the coating agent. For example, this nozzle may be a flatstream nozzle, a round-jet nozzle, an airless nozzle or a nozzle for bead sealing. However, the present disclosure is not limited to the above examples with respect to the type of nozzle.

Furthermore, in accordance with the known applicator described at the beginning, the applicator according to the present disclosure comprises an elongated nozzle carrier which supports the nozzle and serves to position the nozzle.

The applicator according to the present disclosure is distinguished from the known applicator described at the beginning by the fact that the nozzle carrier has a yield region in which the nozzle carrier is substantially less bend-resistant than in the rest of the nozzle carrier in order to be able to yield elastically to contact forces in the event of contact between the applicator and the components to be coated. The yield region of the nozzle carrier thus mechanically softens the nozzle carrier, largely preventing plastic deformation of the nozzle carrier.

In one variant of the present disclosure, the nozzle carrier in the yield region is shaped as a spiral spring and has a number of coils that lie essentially in a common plane. With respect to the number of coils of the spiral spring, the present disclosure is not limited to specific numbers of coils. For example, the spiral spring may have at least 2, 3, 4 or at least 5 coils and/or at most 20, 15, 10, 7 or at most 5 coils.

In another variant of the present disclosure, on the other hand, the nozzle carrier is shaped as a coil spring in the yield region and has a plurality of coils extending with a certain coil pitch in the axial direction. In this variant of the present disclosure, it is again true that the present disclosure is not limited to certain numbers of coils with respect to the number of coils of the coil spring. For example, the coil spring may have at least 2, 3, 4 or at least 5 and/or at most 20, 15, 10, 7 or at most 5 coils.

When the yield region is configured as a coil spring, the coil spring may also taper in the distal direction (i.e. towards the nozzle), for example conically.

In the variant with a coil spring in the yield region, the coil pitch of the coil spring is greater than the diameter of the nozzle carrier so that the individual coils do not lie directly against each other. This has an advantageous effect on the bendability of the nozzle carrier. For example, the coil pitch of the coil spring can be more than twice, three times or four times the diameter of the nozzle carrier.

The diameter of the coil spring is relatively large. For example, the diameter of the coil spring may be greater than five times, eight times, or ten times the coil diameter of the individual coils of the coil spring. The diameter of the coil spring may be larger than the axial length of the coil spring or the yield region.

It should also be mentioned that the nozzle carrier may be a hollow supply pipe over at least part of its length, through which the coating agent to be applied is fed to the nozzle. In this example, the nozzle carrier thus has two functions. On the one hand, the nozzle carrier supports the nozzle and serves to position the nozzle. On the other hand, due to the integrated supply pipe, the nozzle carrier also serves to supply the coating agent to the nozzle.

Alternatively, however, it is also possible for the supply pipe and the nozzle carrier to be separate from one another.

In this case, the coating agent is therefore not fed through the nozzle carrier to the nozzle, but through the separate supply pipe.

In an example of the present disclosure, the nozzle carrier is attached by its proximal end to a mounting flange in order to be able to mount the applicator on a handling device, such as a multi-axis coating robot. For this purpose, only the mounting flange of the applicator must then be mounted on the robot flange of the coating robot, as is known per se from the prior art.

In an example of the present disclosure, the nozzle carrier has four legs, each of which is angled in pairs relative to one another, whereby the angle of curvature between the adjacent legs can be in the range of 60°-120°, 70°-110°, 80°-100° or 85°-95°.

However, it is also possible within the scope of the present disclosure for the nozzle carrier to have fewer than four legs, for example only one, two or three legs.

It should be mentioned here that the individual legs of the nozzle carrier may lie in a common plane, as is also the case with the known applicator described at the beginning.

In an example of the present disclosure, the legs of the applicator are each hollow and form a continuous conduit channel which leads to the nozzle in order to supply the nozzle with the coating agent to be applied. The conduit channel here has a cross-section that is not constant over the length of the conduit channel. Rather, the yield region enables a conduit channel with a conduit cross-section that varies in the longitudinal direction. Thus, the cross-section of the conduit channel in the yield region is larger than in the rest of the nozzle carrier. Furthermore, it should be mentioned that the cross-section of the conduit channel in the proximal leg of the nozzle carrier is larger than in the more distal legs of the nozzle carrier.

In an example of the present disclosure, the nozzle carrier with the nozzle can be manufactured in one piece by a generative manufacturing process, in particular by 3D printing. Here, there is also the possibility that the mounting flange of the applicator is also manufactured as part of the 3D printing process. The material outlet opening (nozzle) is usually introduced separately, e.g. by eroding.

However, it is alternatively possible that only the yield region (e.g., spiral spring) is manufactured by a generative manufacturing process, while further nozzle carrier sections are welded, soldered, glued or pressed to the yield region.

In an example of the present disclosure, the applicator is configured for an application movement in a specific direction of movement. This means that the applicator is moved in operation by a handling device (e.g. coating robot) in the direction of movement, e.g. along a beading seam. Due to a contact between the applicator and the components to be coated, a certain contact force may act on the nozzle carrier, causing it to deflect. The applicator opposes this contact force with a certain spring stiffness, which is defined as the ratio between the contact force acting on the nozzle carrier in the direction of movement and the resulting deflection in the direction of movement. The yield region according to the present disclosure (e.g. coil spring, coil spring) allows here a small spring stiffness, which can be smaller than 10 N/mm, 8 N/mm, 7 N/mm or 6 N/mm.

It should also be mentioned that the supply pipe in the nozzle carrier has an internal cross-section which tapers in the distal direction, i.e. towards the nozzle. Correspondingly, the nozzle carrier has an outer cross-section which also tapers in the distal direction.

Furthermore, it should be mentioned that the present disclosure does not only claim protection for the above-described applicator according to the present disclosure as a single component. Rather, the present disclosure also claims protection for a coating robot comprising such an applicator.

With reference to the Figures, FIG. 1 shows the area of a gap 1 between a motor vehicle door 2 and a fender 3, wherein the motor vehicle door 2 overlaps with the fender 3 in the closed state shown in the drawing in order to improve crash safety.

The motor vehicle door 2 has an inner panel 4 and an outer panel 5, the outer panel 5 being flanged around an angled edge of the inner panel. In the region of the angled edge, the inner panel 4 is joined to the outer panel 5 by a fold gluing 6. With this design, there is a risk of moisture entering the gap between the angled edge of the inner panel 4 and the flanged edge of the outer panel 5 in the area of the flanged seam and causing corrosion. The flanged seam between the inner panel 4 and the outer panel 5 is therefore sealed with a sealing bead 7 to prevent moisture from penetrating into the flanged seam, the sealing bead 7 extending at right angles to the drawing plane over the entire length of the flanged seam. The application of the sealing bead 7 is carried out here by an applicator 8 according to the present disclosure, which projects through the gap 1 between the motor vehicle door 2 and the fender 3, as will be explained in detail.

The applicator according to the present disclosure is positioned by a multi-axis robot and has a mounting flange 9 for mounting on the robot, the robot not being shown for simplicity.

A tubular nozzle carrier 10 is mounted on the mounting flange 9 of the applicator 8. On the one hand, the nozzle carrier 10 serves to mechanically guide a nozzle 11, which is arranged at the distal end of the nozzle carrier 10. On the other hand, the nozzle carrier 10 also serves to guide the sealing compound of the sealing bead 7 from the mounting flange 9 to the nozzle 11, for which purpose the nozzle carrier 10 is hollow.

The nozzle carrier 10 has four legs 12, 13, 14, 15, which are each arranged at right angles to one another with an angle of curvature $\alpha$=90°, $\beta$=90° and $\chi$=90° respectively, the distal legs 12, 13, 14 of the nozzle carrier 10 forming a U-shaped section which engages around the angled edge of the inner panel 5 with the flanged seam. The geometry of the applicator 8 shown allows the nozzle 11 to project through the gap 1 between the motor vehicle door 2 and the fender 3 onto the rear side of the motor vehicle door 2 and the fender 3 in order to apply the sealing compound of the sealing bead 7 to the flanged seam located there. It is not necessary to open the vehicle door 2 beforehand, so that a manual handling robot for opening the vehicle door 2 can be dispensed with.

The proximal leg 15 of the nozzle carrier 10 here has a yield region 16, which is configured as a coil spring. In the yield region 16, the proximal leg 15 of the nozzle carrier 10 thus runs helically in several windings. This reduces the bending stiffness of the nozzle carrier 10 in order to prevent plastic deformation of the nozzle carrier 10 in the event of contact with the fender 3 or the motor vehicle door 2, since the applicator 8 would become non-functional as a result of such plastic deformation of the nozzle carrier 10.

Figure 2:
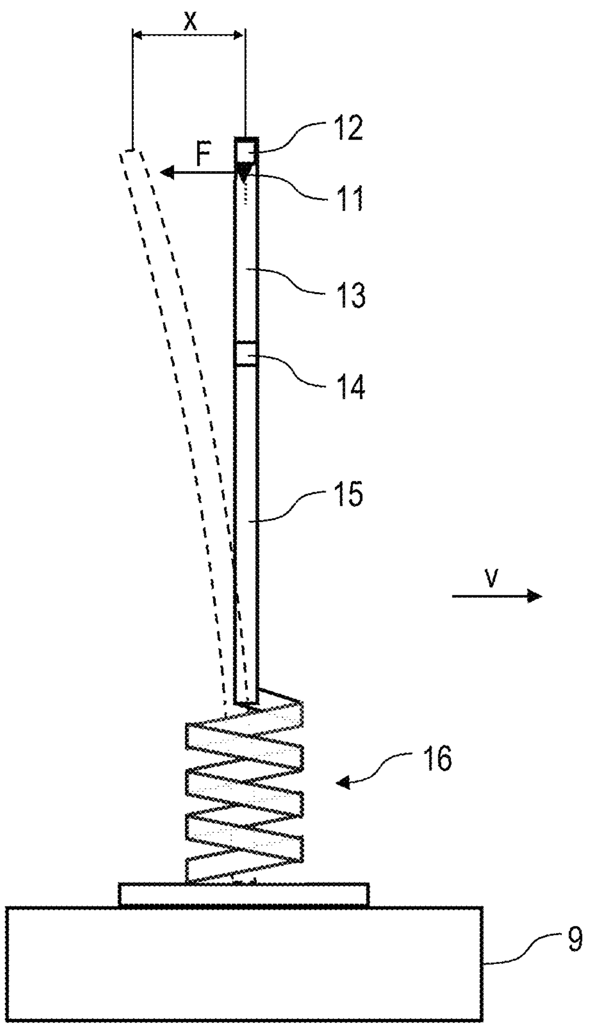
Figure 3:
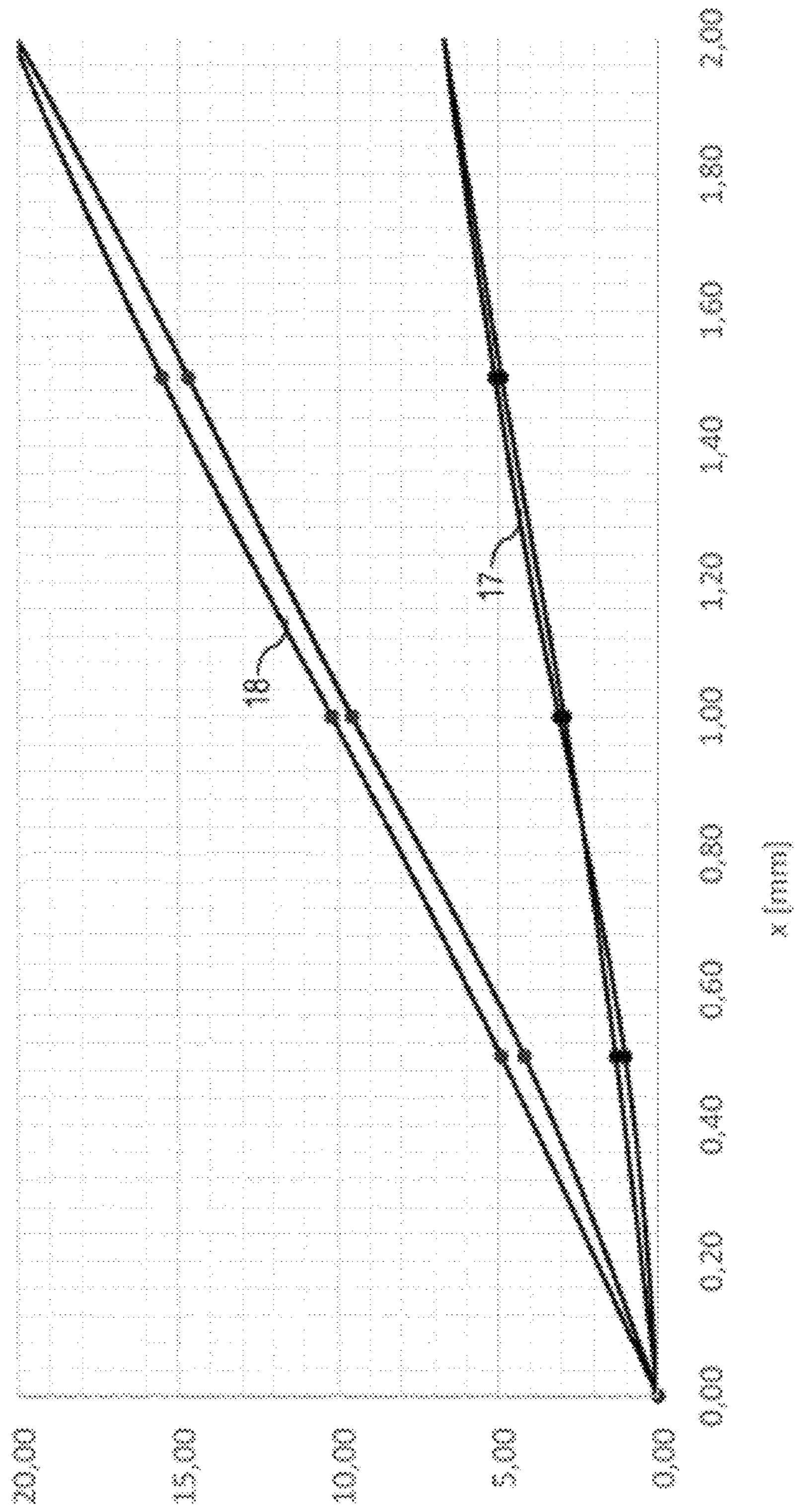

During application operation, the applicator 8 is moved in a direction of movement v along the gap 1, i.e. at right angles into the drawing plane in FIG. 1 and from left to right in FIG. 2. In the event of contact between the applicator 8 on the one hand and the motor vehicle door 2 or the fender 3 on the other, a contact force F acts on the applicator 8, whereby the contact force F can act, for example, on the nozzle 11, as shown in FIG. 2. Other possible contact points are, for example, on the legs 13, 14. The contact force F leads to a corresponding deflection x against the direction of movement v, so that the nozzle carrier 10 assumes a deformed position, which is shown as a dashed line in FIG. 2. The yield region 16 ensures that the spring stiffness of the nozzle carrier 10 as the ratio between the contact force F and the resulting deflection x is considerably smaller than with the known conventional applicators described at the beginning. For example, the diagram in FIG. 3 shows a corresponding spring characteristic 17 of the applicator 8 according to the present disclosure in comparison with a spring characteristic 18 of conventional applicators. It can be seen from the diagram that the applicator 8 according to the present disclosure is much less resistant to bending, which is achieved by the yield region 16. This prevents the applicator 8 from being damaged during operation due to contact with the component to be coated.

In addition to the contact force shown in the direction of movement, further contact forces may also be generated, for example perpendicular to the direction of movement, by contact of the leg 12 with the flanged surface. A further contact force can be generated by contact of the leg 13 with the door edge. Even when these contact forces occur, the integrated spring stiffness (resilience) has a beneficial effect.

Figure 4:
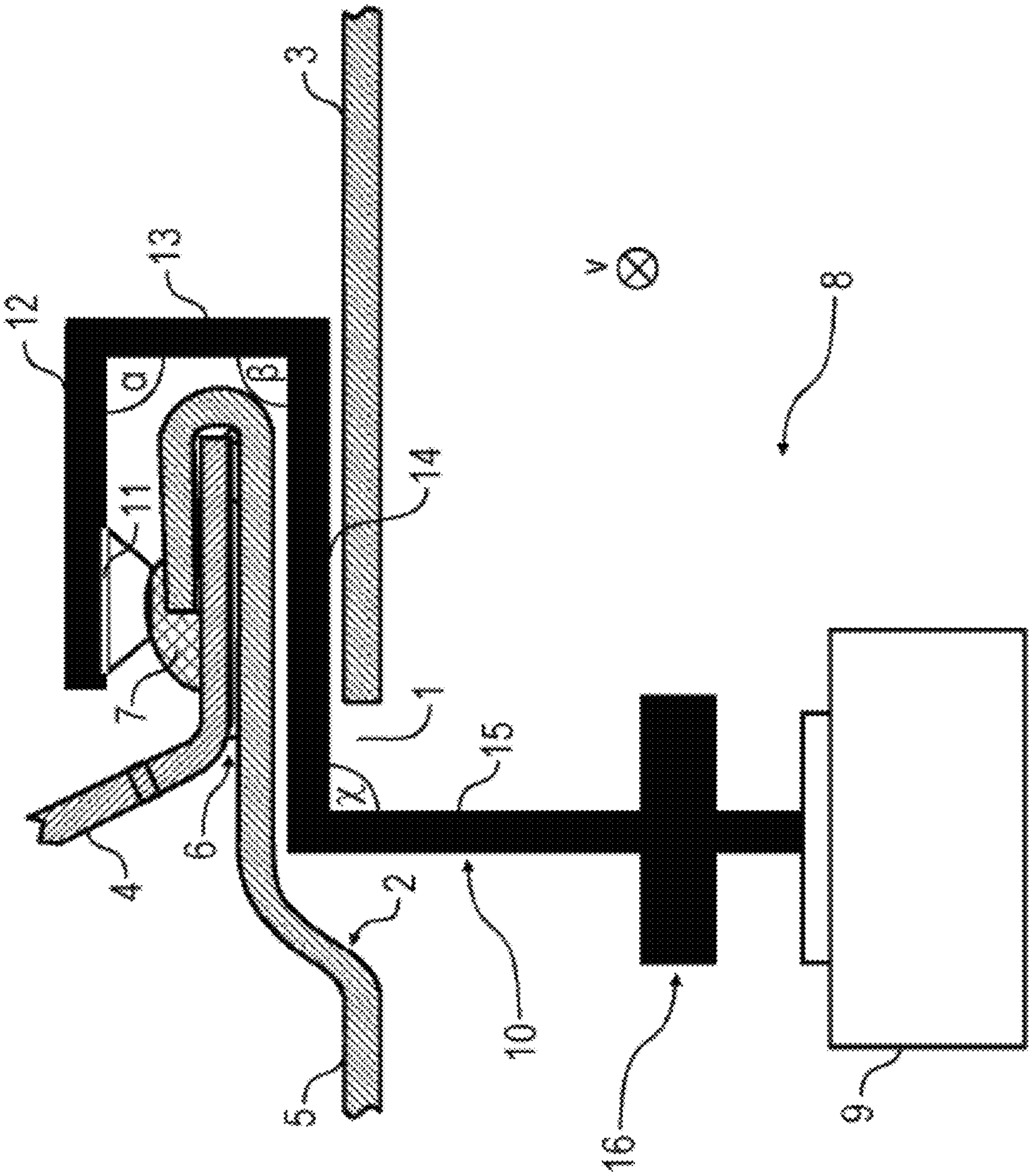

FIG. 4 shows a modification of the applicator 8 according to the present disclosure, whereby this modified example largely corresponds to the example described above, so that in order to avoid repetition, reference is made to the above description, whereby the same reference signs are used for corresponding details.

A special feature of this example is that the yield region 16 is not configured as a coil spring but as a spiral spring, the spiral spring being shown only schematically in the drawing. The spiral spring differs from the coil spring described above in that the coils of the spiral spring lie essentially in the same plane.

Figure 5:
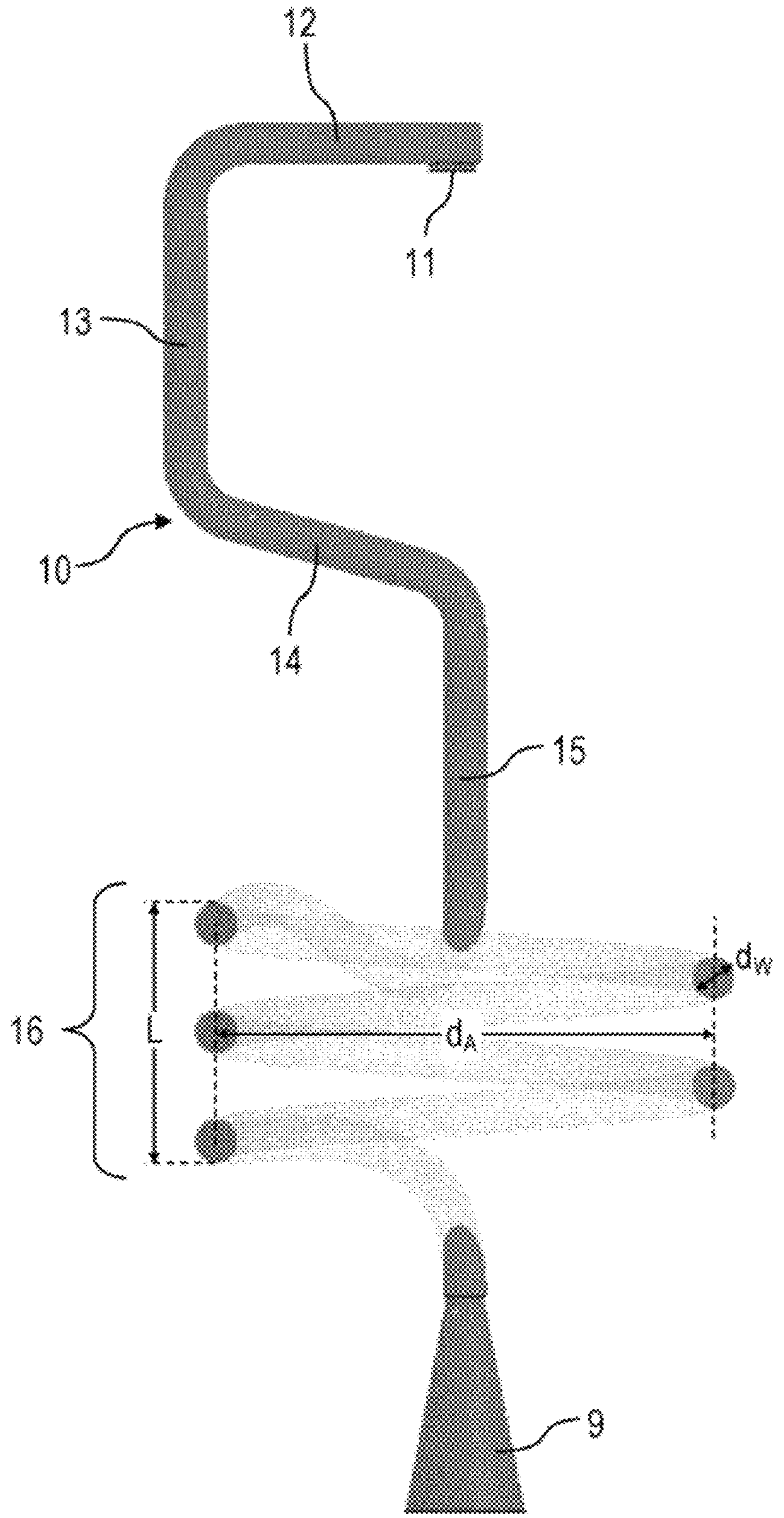

FIG. 5 shows a modification of the applicator 8 according to the present disclosure, whereby this modified example largely corresponds to the examples described above, so that in order to avoid repetition, reference is made to the above description, whereby the same reference signs are used for corresponding details.

A special feature of this example is the design of the yield region 16, which is realized here as a coil spring with a relatively large diameter $d_A$. Thus, the diameter $d_A$ of the coil spring is almost twice as large as the axial length L of the yield region 16 or of the coil spring forming the yield region 16. Furthermore, it should be mentioned that the diameter $d_A$ of the coil spring is more than ten times larger than the diameter $d_W$ of the individual coils of the coil spring.

The present disclosure is not limited to the examples described above. Rather, a large number of variants and variations are possible which also make use of the inventive concept and therefore fall within the scope of protection. In particular, the present disclosure also claims protection for the subject matter and the features of the sub-claims independently of the claims referred to in each case and in particular also without the features of the main claim. The present disclosure thus comprises different aspects of the present disclosure which enjoy protection independently of each other.

LIST OF REFERENCE SIGNS

1 Gap
2 Motor vehicle door
3 Fender
4 Inner panel
5 Outer panel
6 Fold gluing
7 Sealing bead
8 Applicator
9 Mounting flange of the applicator
10 Nozzle carrier
11 Nozzle
12 Leg with material outlet opening (nozzle)
13-15 Leg
16 Yield region
17 Exemplary spring characteristic of the applicator according to the present disclosure
18 Exemplary spring characteristic of the conventional applicator
F Contact force
v Direction of movement of the applicator
x Deflection of the applicator
$\alpha$ Angle of curvature between the legs 12, 13
$\beta$ Angle of curvature between the legs 13, 14
$\chi$ Angle of curvature between the legs 14, 15

The invention claimed is:

1. An applicator for applying a coating agent to a component, the applicator comprising:

a) a nozzle for dispensing the coating agent, and b) a nozzle carrier which carries the nozzle, c) wherein the nozzle carrier has a yield region in which the nozzle carrier is less bend-resistant than in the rest of the nozzle carrier to yield elastically in relation to contact forces in the event of contact between the applicator and the component to be coated, the yield region includes a hollow supply pipe shaped as a coil spring through which the coating agent to be applied is conducted to the nozzle, d) the nozzle carrier has a distal first leg on which the nozzle is arranged, e) the nozzle carrier has a second leg which adjoins the distal first leg and is curved at a specific angle of curvature with respect to the distal first leg, the angle of curvature between the distal first leg and the second leg being in the range 60°-120°, f) the nozzle carrier has a third leg which adjoins the second leg and is curved with respect to the second leg with a specific angle of curvature, the angle of curvature between the second leg and the third leg being in the range 60°-120°, and g) the nozzle carrier has a fourth leg which adjoins the third leg and is curved with respect to the third leg at a specific angle of curvature, the angle of curvature between the third leg and the fourth leg being in the range 60°-120°.

2. The applicator according to claim 1, wherein the number of windings of the coil spring is between 4 and 15.

3. The applicator according to claim 1, wherein the coil spring tapers in the distal direction.

4. The applicator according to claim 1, wherein a) the coil spring of the hollow supply pipe includes a plurality of windings extending with a winding pitch in the axial direction, the winding pitch of the coil spring is more than twice the diameter of the nozzle carrier, and b) the diameter of the coil spring is greater than b1) five times the outside diameter of the individual coils of the coil spring, and b2) the axial length of the coil spring.

5. The applicator according to claim 1, wherein the nozzle carrier is attached at a proximal end to a mounting flange to mount the applicator on a handling device.

6. The applicator according to claim 1, wherein a) the distal first leg and the third leg are substantially parallel to each other, and b) the second leg and the fourth leg are substantially parallel to each other, and c) the nozzle discharges the coating agent substantially parallel to the fourth leg in the direction of the fourth leg, and d) the distal first leg and the second leg and the third leg and the fourth leg lie in a common plane, and e) the yield region is located in the fourth leg of the nozzle carrier.

7. The applicator according to claim 6, wherein a) the distal first leg, the second leg, the third leg and the fourth leg of the applicator are each hollow and form a continuous conduit channel leading to the nozzle for supplying the nozzle with the coating agent to be applied, and b) the continuous conduit channel has a cross-section which is b1) is larger in the fourth leg than in the third leg, in the second leg and/or in the distal first leg, and b2) is greater in the yield region than in the rest of the nozzle carrier.

8. The applicator according to claim 1, wherein the nozzle carrier with the nozzle is one piece and manufactured by a generative manufacturing process.

9. The applicator according to claim 1, wherein the yield region is manufactured by a generative manufacturing process, while further nozzle carrier sections are welded or soldered or bonded or pressed to the yield region.

10. The applicator according to claim 1, wherein a) the applicator is configured for an application movement in a certain direction of movement, b) the applicator exhibits a specific deflection in the direction of movement at the nozzle when a specific contact force acts on the nozzle carrier in the direction of application, and c) the applicator has a spring stiffness which is defined as the ratio between the contact force acting on the nozzle carrier in the direction of movement and the resulting deflection in the direction of movement, the spring stiffness being less than 10 N/mm.

11. The applicator according to claim 1, wherein the nozzle is configured to apply the application material to the workpiece surface in one of the following ways:

a) as a flat jet, b) as a round jet, c) as an airless jet.

12. The applicator according to claim 1, wherein the hollow supply pipe in the nozzle carrier has an internal cross section which decreases in the distal direction.

13. The applicator according to claim 1, wherein the nozzle carrier has an outer cross section which tapers in the distal direction.

14. A coating robot with an applicator according to claim 1.

15. An applicator for applying a coating agent to a component, the applicator comprising:

a) a nozzle for dispensing the coating agent and b) a nozzle carrier which carries the nozzle, c) wherein the nozzle carrier has a yield region in which the nozzle carrier is substantially less bend-resistant than in the rest of the nozzle carrier to yield elastically in relation to contact forces in the event of contact between the applicator and the component to be coated, the nozzle carrier includes a hollow supply pipe shaped as a spiral spring in the yield region through which the coating agent to be applied is conducted to the nozzle, d) the nozzle carrier has a distal first leg on which the nozzle is arranged, e) the nozzle carrier has a second leg which adjoins the distal first leg and is curved at a specific angle of curvature with respect to the distal first leg, the angle of curvature between the distal first leg and the second leg being in the range 60°-120°, f) the nozzle carrier has a third leg which adjoins the second leg and is curved with respect to the second leg with a specific angle of curvature, the angle of curvature between the second leg and the third leg being in the range 60°-120°, and g) the nozzle carrier has a fourth leg which adjoins the third leg and is curved with respect to the third leg at a specific angle of curvature, the angle of curvature between the third leg and the fourth leg being in the range 60°-120°.

16. The applicator according to claim 15, wherein the spiral spring has a plurality of windings which lie in a common plane.

17. The applicator according to claim 16, wherein the number of windings of the spiral spring is between 4 and 15.

* * * * *